United States Patent
Alsamhan et al.

(10) Patent No.: US 10,442,029 B1
(45) Date of Patent: Oct. 15, 2019

(54) METHOD OF FRICTION STIR SPOT WELDING

(71) Applicant: KING SAUD UNIVERSITY, Riyadh (SA)

(72) Inventors: Ali Mohamad Ali Alsamhan, Riyadh (SA); Ahmed Nageeb Ahmed Badwelan, Ad Diriyah (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/380,942

(22) Filed: Apr. 10, 2019

(51) Int. Cl.
*B23K 20/12* (2006.01)

(52) U.S. Cl.
CPC .......... *B23K 20/122* (2013.01); *B23K 20/123* (2013.01); *B23K 20/124* (2013.01)

(58) Field of Classification Search
CPC ........................................ B23K 20/122–1295
USPC ................................................ 228/112.1, 2.1
See application file for complete search history.

(56) References Cited

U.S. PATENT DOCUMENTS

| | | | | |
|---|---|---|---|---|
| 8,052,029 B1* | 11/2011 | Sigler | B23K 20/1265 | 228/103 |
| 8,556,156 B1* | 10/2013 | Bharadwaj | B23K 20/1235 | 228/102 |
| 8,950,650 B2* | 2/2015 | Okada | B23K 20/1245 | 228/102 |
| 2006/0169740 A1* | 8/2006 | Fukuhara | B23K 20/125 | 228/2.1 |
| 2008/0083817 A1* | 4/2008 | Baumann | B23K 20/123 | 228/102 |
| 2008/0135601 A1* | 6/2008 | Chen | B23K 20/1235 | 228/102 |
| 2009/0140026 A1* | 6/2009 | Okauchi | B23K 20/123 | 228/104 |
| 2009/0236028 A1* | 9/2009 | Fukuda | B21J 5/063 | 156/73.5 |

(Continued)

FOREIGN PATENT DOCUMENTS

| | | |
|---|---|---|
| CN | 101817142 A | 9/2010 |
| CN | 108274110 A | 7/2018 |
| WO | 2018079806 A1 | 5/2018 |

OTHER PUBLICATIONS

Jambhale et al. "Effect of process parameters & tool geometries on properties of friction stir spot welds: a review." Universal Journal of Engineering Science 3.1 (2015): 6-11.

*Primary Examiner* — Kiley S Stoner
(74) *Attorney, Agent, or Firm* — Richard C. Litman

(57) ABSTRACT

The method of friction stir spot welding uses a database of stored optimization parameters to maximize welding strength for an input type of material and an input geometrical parameter of the material, such as its thickness. Experiments are performed for a variety of different materials having different thicknesses. Each experiment performed for each material and each thickness associated with the material measures the welding strength of a friction stir spot welding process for varying values of an initial dynamic welding parameter, a final dynamic welding parameter and a type of varying function. The values of the initial dynamic welding parameter, final dynamic welding parameter and type of varying function that maximize the measured welding strength for the selected material and its selected thickness are stored in a lookup table. A rotating tool may then be controlled using these optimized values in order to maximize welding strength.

7 Claims, 1 Drawing Sheet

(56) References Cited

U.S. PATENT DOCUMENTS

| | | | |
|---|---|---|---|
| 2010/0089977 A1* | 4/2010 | Chen | B23K 20/122 228/114.5 |
| 2012/0153007 A1* | 6/2012 | Sall | B23K 20/1255 228/112.1 |
| 2014/0207274 A1* | 7/2014 | Ross | B23K 20/1235 700/207 |
| 2015/0041521 A1* | 2/2015 | Matsushita | B23K 20/227 228/112.1 |
| 2015/0231734 A1* | 8/2015 | Okada | B23K 20/123 228/2.1 |
| 2017/0136571 A1* | 5/2017 | Utsumi | B23K 20/12 |
| 2017/0304935 A1 | 10/2017 | Okada et al. | |
| 2018/0257169 A1 | 9/2018 | Okada et al. | |
| 2018/0281104 A1* | 10/2018 | Odakura | B23K 20/1235 |
| 2019/0143442 A1* | 5/2019 | Ohashi | B23K 11/115 |

* cited by examiner

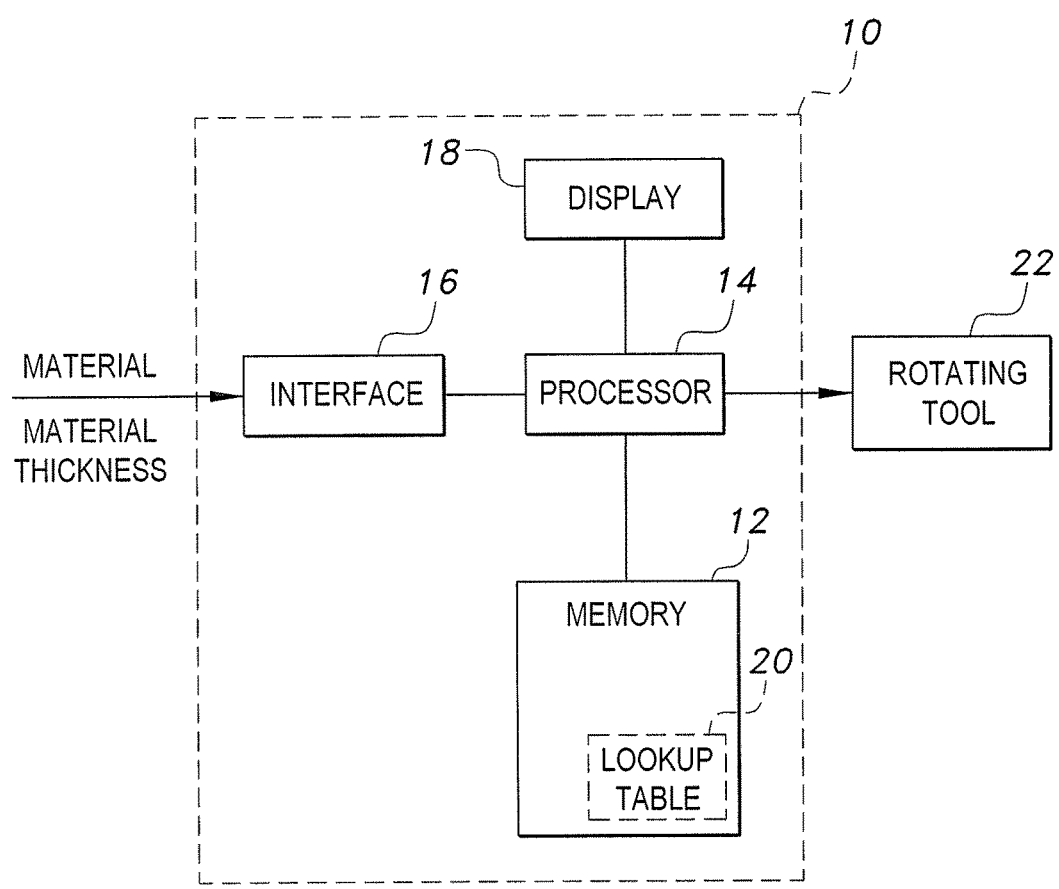

METHOD OF FRICTION STIR SPOT WELDING

BACKGROUND

1. Field

The disclosure of the present patent application relates to welding techniques, and particularly to a method of friction stir spot welding that maximizes the strength of the weld.

2. Description of the Related Art

Friction stir spot welding (FSSW) is a pressure welding process that operates below the melting point of the workpieces being welded. FSSW is a variant of friction stir welding. In friction stir spot welding, individual spot welds are created by pressing a rotating tool with high force onto the top surface of two sheets that overlap each other in a lap joint. The frictional heat and the high pressure plasticize the workpiece material, so that the tip of the pin plunges into the joint area between the two sheets and stirs up the oxides. The pin of the tool is plunged into the sheets until the shoulder is in contact with the surface of the top sheet. The shoulder applies a high forging pressure, which bonds the components metallurgically without melting. After a short dwell time, the tool is pulled out of the workpieces again so that a spot weld can be made about every 5 seconds.

The tool consists of a rotating pin and a shoulder. The pin is the part of the tool that penetrates into the materials. Both the pin and the shoulder may be profiled to push the plasticized material in a particular direction and to efficiently break-up and disperse the oxide skins on the adjacent surfaces. Two of the most important process parameters are the spindle speed and tool feed rate. Modern spot welding guns can be used via position control, force control or a product-specific programmed force-displacement control. Often, position control is used until a certain displacement is reached, and then the control system is switched to force control during the dwell time. Even during the force-controlled dwell time, certain position values can be specified, which should not be undermatched or exceeded. It would obviously be desirable to be able to optimize the process parameters so that welding strength is maximized each time the spot welding gun is used. Thus, a method of friction stir spot welding solving the aforementioned problems is desired.

SUMMARY

The method of friction stir spot welding uses a database of stored optimization parameters for maximizing welding strength for an input type of material (workpiece) and an input geometrical parameter of the material, such as its thickness. Experiments are performed for a variety of different materials having different thicknesses. Each experiment performed for each material and each thickness associated with the material measures the welding strength of a friction stir spot welding process for varying values of an initial dynamic welding parameter, a final dynamic welding parameter and a type of varying function. The values of the initial dynamic welding parameter, final dynamic welding parameter and type of varying function that maximize the measured welding strength for the selected material and its selected thickness are stored in a lookup table.

In use, the user then inputs a particular material and a particular thickness associated with the material. The optimal initial dynamic welding parameter, final dynamic welding parameter and type of varying function associated with the input material and the input thickness are obtained from the lookup table. The optimal initial dynamic welding parameter, final dynamic welding parameter and type of varying function are then transmitted to a rotating tool, so that friction stir spot welding may be performed with the rotating tool, where the rotating tool is controlled to operate with the initial dynamic welding parameter, the final dynamic welding parameter and the type of varying function. The particular dynamic welding parameters may include the spindle speed of the rotating tool and the feed rate of the rotating tool. The type of varying function may include a stepwise variation, a linear variation, an exponential variation, etc.

These and other features of the present disclosure will become readily apparent upon further review of the following specification and drawings.

BRIEF DESCRIPTION OF THE DRAWINGS

The sole drawing FIGURE is a block diagram showing a control system for the method of friction stir spot welding.

Similar reference characters denote corresponding features consistently throughout the attached drawings.

DETAILED DESCRIPTION OF THE PREFERRED EMBODIMENTS

The method of friction stir spot welding uses a database of stored optimization parameters to maximize welding strength for an input type of material (workpiece) and an input geometrical parameter of the material, such as its thickness. Experiments are performed for a variety of different materials having different thicknesses. Each experiment performed for each material and each thickness associated with the material measures the welding strength of a friction stir spot welding process for varying values of an initial dynamic welding parameter, a final dynamic welding parameter and a type of varying function. The values of the initial dynamic welding parameter, final dynamic welding parameter and type of varying function which maximize the measured welding strength for the selected material and its selected thickness are stored in a lookup table. Conventional friction stir spot welding is usually performed by setting certain parameters affecting the strength of the weld (tool feed rate, spindle speed, plunge depth, etc.) initially and leaving those parameters unchanged until the weld is complete, i.e., the parameters are static. The present method operates by setting the parameters initially, but then changing the parameters (stepwise, linearly, exponentially, etc.) during welding according to a selectable function found by experience to strengthen the weld for workpiece material of a particular type and thickness, the parameters therefore being dynamic.

It should be understood that the calculations may be performed by any suitable computer system, such as by control system 10 diagrammatically shown in the sole drawing FIGURE. Data, such as the selected material and material thickness, as well as the data for lookup table 20, is entered into system 10 via any suitable type of user interface 16, and may be stored in memory 12, which may be any suitable type of computer readable and programmable memory and is preferably a non-transitory, computer readable storage medium. Calculations are performed by processor 14, which may be any suitable type of computer processor and may be displayed to the user on display 18, which may be any suitable type of computer display.

Processor 14 may be associated with, or incorporated into, any suitable type of computing device, for example, a personal computer or a programmable logic controller. The display 18, the processor 14, the memory 12 and any associated computer readable recording media are in communication with one another by any suitable type of data bus, as is well known in the art.

Examples of computer-readable recording media include non-transitory storage media, a magnetic recording apparatus, an optical disk, a magneto-optical disk, and/or a semiconductor memory (for example, RAM, ROM, etc.). Examples of magnetic recording apparatus that may be used in addition to memory 12, or in place of memory 12, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. It should be understood that non-transitory computer-readable storage media include all computer-readable media, with the sole exception being a transitory, propagating signal.

In use, the user inputs a particular material and a particular thickness associated with the material. Referring to the sole drawing FIGURE, the material and material thickness are entered into control system 10 by interface 16. The optimal initial dynamic welding parameter, final dynamic welding parameter and type of varying function associated with the input material and the input thickness are obtained from the lookup table 20, which is stored in computer readable memory 12. The optimal initial dynamic welding parameter, final dynamic welding parameter and type of varying function are then transmitted to a rotating tool 22, so that friction stir spot welding may be performed with the rotating tool 22, where the rotating tool 22 is controlled by processor 14 to operate with the initial dynamic welding parameter, the final dynamic welding parameter and the type of varying function. The particular dynamic welding parameters may include the spindle speed of the rotating tool 22 and the feed rate of the rotating tool 22. The type of varying function may include a stepwise variation, a linear variation, an exponential function, etc.

As an example, Table 1 below shows measured welding strengths (WSs) for friction stir spot welding of sheets of AA1050 aluminum alloy with 1.5 mm thickness. The values given in Table 1 are shown for spindle speed (SS) as the dynamic welding parameter (DWP), with an initial dynamic welding parameter ($DWP_i$) of 1000 rpm, varying values of final dynamic welding parameter ($DWP_f$), and varying functions (VFs) of both stepwise (SW) and linear (L) type. Eight individual tests were performed in this example. Similarly, Table 2 below shows measured welding strengths (WSs) for friction stir spot welding of the same type of sheets of 1050 aluminum alloy with 1.5 mm thickness. The values given in Table 2 are shown for feed rate (FR) of the rotating tool as the dynamic welding parameter (DWP), with an initial dynamic welding parameter ($DWP_i$) of 5 mm/min, varying values of final dynamic welding parameter ($DWP_f$), and varying functions (VFs) of both stepwise (SW) and linear (L) type. Eight individual tests were also performed in this example.

TABLE 1

Experimental Values for DWP = Spindle Speed

| Test # | $DWP_i$ (rpm) | $DWP_f$ (rpm) | VF | WS (N) |
|---|---|---|---|---|
| 1 | 1000 | 500 | SW | 3488.0 |
| 2 | 1000 | 500 | L | 3485.3 |
| 3 | 1000 | 750 | SW | 3220.3 |
| 4 | 1000 | 750 | L | 3304.1 |
| 5 | 1000 | 1250 | SW | 3183.1 |
| 6 | 1000 | 1250 | L | 3032.1 |
| 7 | 1000 | 1500 | SW | 2996.4 |
| 8 | 1000 | 1500 | L | 3006.4 |

TABLE 2

Experimental Values for DWP = Tool Feed Rate

| Test # | $DWP_i$ (mm/min) | $DWP_f$ (mm/min) | VF | WS (N) |
|---|---|---|---|---|
| 9 | 5 | 2.5 | SW | 3142.2 |
| 10 | 5 | 2.5 | L | 3006.4 |
| 11 | 5 | 3.75 | SW | 3145.8 |
| 12 | 5 | 3.75 | L | 2171.0 |
| 13 | 5 | 6.25 | SW | 3074.4 |
| 14 | 5 | 6.25 | L | 2200.6 |
| 15 | 5 | 7.5 | SW | 2989.6 |
| 16 | 5 | 7.5 | L | 2158.0 |

From the data in Tables 1 and 2, the maximum welding strength (3488.0 N) is found in test #1, corresponding to a stepwise variation in spindle speed, from 1000 rpm to 500 rpm, and these parameters are stored in the lookup table 20. For each type of material, and each thickness of the material, similar experiments are performed, and the optimal parameters for each material and material thickness (i.e., the parameters which result in the maximum welding strength for each round of testing) are stored in lookup table 20 in computer readable memory 12. Thus, if the user enters AA1050 aluminum alloy and a thickness of 1.5 mm into control system 10, for example, using interface 16, the lookup table parameters corresponding to this input include an initial spindle speed of 1000 rpm, a final spindle speed of 500 rpm, with a stepwise variation therebetween through operation of the rotating tool 22. Processor 14 then transmits these control parameters to rotating tool 22 to maximize the welding strength of the friction stir spot welding of the AA1050 aluminum alloy sheet. It should be understood that additional parameters may be stored in lookup table 20, including, for example, data pertaining to further types of dynamic welding parameters, such as tool plunging depth, as well as other types of varying functions, and other geometrical parameters associated with the materials, such as surface area, length, width, shape, etc.

It is to be understood that the method of friction stir spot welding using a lookup table is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of friction stir spot welding, comprising the steps of:

storing a lookup table in non-transitory computer readable memory, the lookup table including a data array for a plurality of materials and a plurality of thicknesses for each of the materials, and for each of the thicknesses of each of the materials, an initial dynamic welding parameter, a final dynamic welding parameter, and a type of varying function for changing the dynamic welding parameter from the initial to the final parameter during friction stir spot welding of a lap joint of a workpiece having the corresponding material and the corresponding thickness to maximize strength of the spot weld;

receiving an input material and an input thickness associated with the input material;

obtaining the initial dynamic welding parameter, the final dynamic welding parameter and the type of varying function associated with the input material and the input thickness from the lookup table;

transmitting the initial dynamic welding parameter, the final dynamic welding parameter, and the type of varying function to a rotating tool; and performing friction stir spot welding with the rotating tool, the rotating tool being controlled to operate with the initial dynamic welding parameter, the final dynamic welding parameter, and the type of varying function.

2. The method of friction stir spot welding as recited in claim 1, wherein the initial dynamic welding parameter comprises an initial spindle speed of the rotating tool, and the final dynamic welding parameter comprises a final spindle speed of the rotating tool.

3. The method of friction stir spot welding as recited in claim 2, wherein the type of varying function comprises a stepwise variation in spindle speed.

4. The method of friction stir spot welding as recited in claim 2, wherein the type of varying function comprises a linear variation in spindle speed.

5. The method of friction stir spot welding as recited in claim 1, wherein the initial dynamic welding parameter comprises an initial feed rate of the rotating tool, and the final dynamic welding parameter comprises a final feed rate of the rotating tool.

6. The method of friction stir spot welding as recited in claim 5, wherein the type of varying function comprises a stepwise variation in feed rate.

7. The method of friction stir spot welding as recited in claim 5, wherein the type of varying function comprises a linear variation in feed rate.

* * * * *